United States Patent Office 3,478,672
Patented Nov. 18, 1969

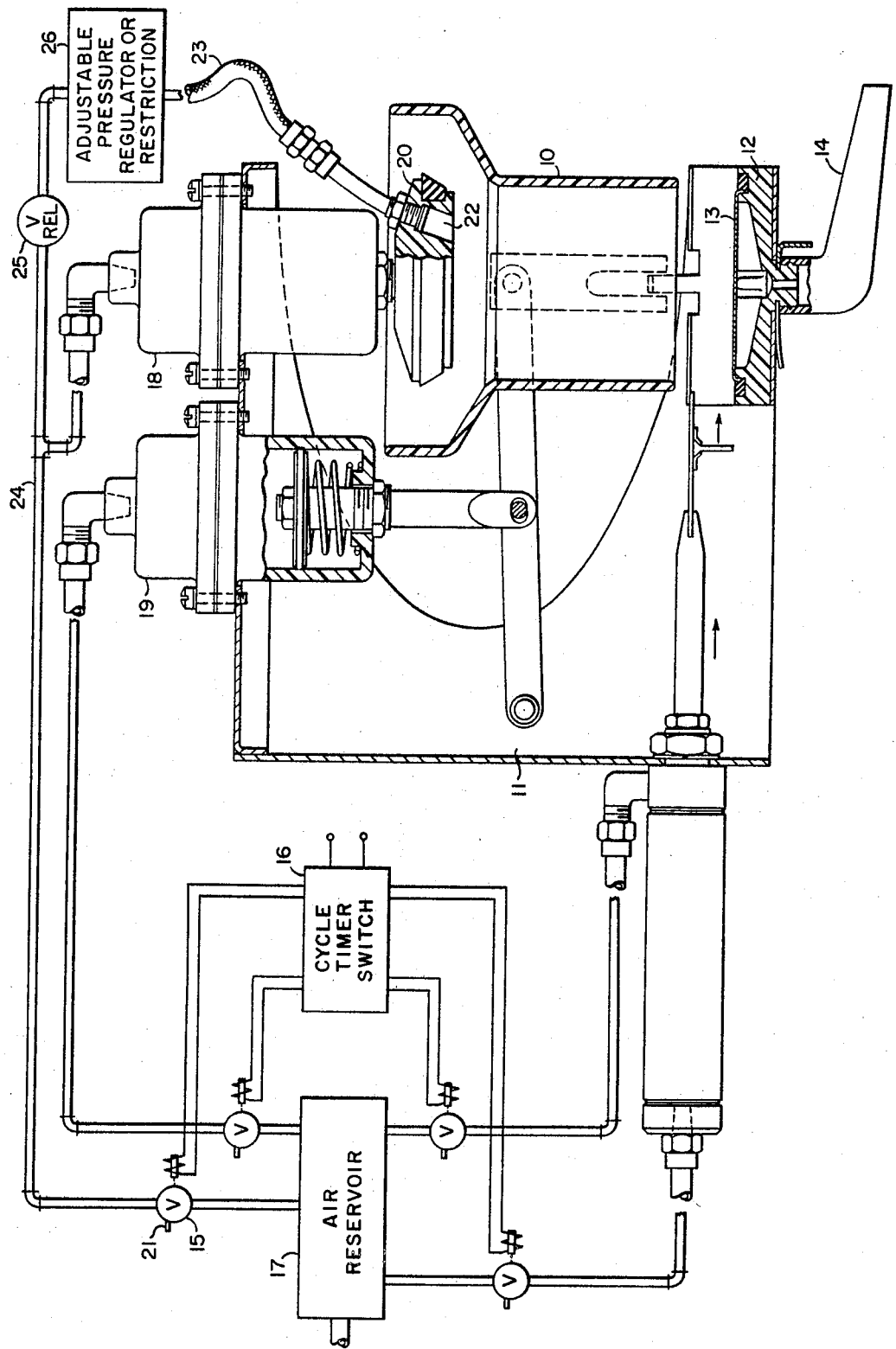

3,478,672
PRESSURIZER APPARATUS FOR AN AIR OPERATED COFFEE BREWER
Norman L. Fuqua, Wilbraham, Mass., assignor to Westinghouse Electric Corporation, Pittsburgh, Pa., a corporation of Pennsylvania
Filed June 28, 1968, Ser. No. 741,025
Int. Cl. A47j 31/32
U.S. Cl. 99—302                                    5 Claims

ABSTRACT OF THE DISCLOSURE

In an air operated coffee brewer having a movable stopper and brew cylinder together with an air cylinder with piston and rod connected to the stopper to move the stopper into sealing relation with the brew cylinder during the brew cycle; the pressurizer for the brew cylinder comprising a bore through the stopper and an air line with a pressure relief valve therein connecting the bore to the air pressure in the air cylinder. In a preferred form, a pressure regulator is also provided in the air line between the pressure relief valve and the stopper.

Cross references to related patent applications

An air operated coffee brewer with which the pressurizing arrangement of the present invention may be used is described in the copending U.S. patent application 741,027, assigned to the same assignee as the present patent application.

Background of the invention

Air operated coffee brewers of the type disclosed by the above mentioned copending patent application Ser. No. 741,027 have a movable stopper and an air piston for moving the stopper into sealing relation with the upper open end of the brew cylinder whose lower end may be connected to a filter screen and brewed coffee outlet. In order to extract the brewed coffee through the filter screen in a given period of time which may be known as the brewing time during the brew cycle, air under pressure is introduced into the brew cylinder while the stopper is in sealing relation thereto. If the build-up of pressure in the brew cylinder during the brewing time of the brew cycle is too rapid or becomes excessive, the extraction time may be undesirably short resulting in a weak flavor of coffee. One arrangement for preventing excessive air pressure in the brew cylinder during the brew cycle as disclosed in the aforementioned copending patent application is to provide a separate air control valve together with a pressure reducing valve in the air line to the brew cylinder. In order to simplify the design it would be desirable to eliminate the separate air control valve for the air pressurizing line to the brew cylinder.

Prior art

Applicant is unaware of any prior art arrangements for pressurizing an air operated coffee brewer in a manner similar to this invention.

Summary

According to the invention, a movable stopper for an air operated coffee brewing cylinder is moved into sealing relation with the upper open end of the brew cylinder during the brew cycle by means of an air cylinder supplied with air under pressure during the appropriate time in each brew cycle under the control of an air valve connected to be controlled by a cycle timer of conventional design. The stopper is provided with an opening or bore therethrough and an air line is connected thereto from the previously mentioned air line to the air cylinder so that when air under pressure is supplied to the air cylinder for moving the stopper into sealing relation, a portion of such air under pressure will also be supplied to the brew cup for pressurizing the brew cup at that time. A feature of the invention is the provision of a pressure relief valve in the air line from the air cylinder to the brew cylinder stopper and this valve is adapted to open only after an air pressure is present in the air cylinder sufficient to move the stopper into sealing relation with the brew cylinder. In addition, in the preferred form of the invention, a regulator which may be either a restriction or a pressure regulating valve is placed in the air line between the pressure relief valve and the stopper so that the amount of pressure in the brew cylinder or the rate of pressure build-up in the brew cylinder during the brewing portion of the brew cycle is not excessive and may be controlled to be less than the pressure required to operate the air cylinder. Thus the stopper remains seated on the brew cylinder during the brewing portion of the brew cycle and the speed of extraction of brewed coffee through the filtered screen is controlled.

Further objects, features and the attendant advantages of the invention will be apparent with the references to the following specification and drawing.

Brief description of the drawing

The sole figure of the drawing is a side elevational view of an air operated coffee brewer partly shown in section together with the air reservoir, air valves, cycle timer switch and the brew cup pressurizing arrangement of the invention.

Description of the preferred embodiment of the invention

An air operated coffee brewer of the type for which the pressurizing arrangement of the present invention is especially adapted is described in detail in the copending patent application mentioned above and for the sake of simplicity of the present description and drawings only those portions of the brewer which need to be specifically described for an understanding of the present invention will be referred to in detail, reference being had to the aforementioned copending patent application for further details of the air operated coffee brewing device.

A brew cylinder 10 is movably supported on the frame 11 which also supports the brew platform 12 having on its upper surface the filter screen 13 through which brewed coffee from the brew cylinder 10 is extracted to the coffee outlet 14 during a brew cycle. After the charge of hot water and coffee has been added to the brew cylinder 10 during each brew cycle, the valve 15 is operated by the cycle timer switch 16 to admit air under pressure from the air reservoir 17 to the air cylinder 18 which is of a spring return type similar to that shown for the air cylinder 19. Thus so long as the valve 15 is operated to be open during the brewing portion of the brew cycle, air under pressure in the cylinder 18 will move to and maintain the stopper 20 in sealing engagement with the normally open upper end of the brew cylinder 10. Upon closure of the valve 15, the air in the cylinder 18 is vented through the valve vent 21 to the atmosphere and the stopper 20 returns to its normal raised position as shown by the drawing.

In order to pressurize the interior of the brew cylinder 10 during the brewing portion of the cycle and while the stopper 20 is maintained in sealing relation on the cylinder 10, an opening or bore 22 is formed through the stopper 20 and is connected by the air line 23 to the air line 24 and the air under pressure in the cylinder 18. A pressure relief valve which may be of conventional construction such as a spring loaded disc, is arranged to open and pass air through the opening 22 in the stopper only when the pressure in the air cylinder 18 is above the amount required to move the stopper 20 into sealing relation with the brew cylinder 10. Such pressure may be in the order of about 25 or 30 pounds per square inch although it is obvious that this is a parameter that can be varied depending on the other parameters involved such as the size of the piston for the cylinder 18 relative to the size of the stopper 20, etc.

A pressure of 25 pounds per square inch in the line 23 after the check valve 25 has opened is under certain conditions of coffee grind and extraction screen opening sizes too high an air pressure for pressurizing the brew cylinder 10 and conceivably could extract the brewed coffee through the filter screen 13 at too rapid a rate for good coffee flavor. Therefore, according to the invention in its preferred form, a regulator is placed in the air line between the pressure relief valve 25 and the stopper opening 22. This regulator shown at 26 may be a relatively complex pressure regulator or may be a simple restriction and if for the sake of simplicity a restriction is used, it will be understood that the size of the restriction opening will be such as to reduce the flow of air into the brew cylinders so that an excessive pressure does not build up within the brew cylinder 10 during the brew time portion of the brew cycle. On the other hand, if a pressure regulating valve is used at 26, it will be designed to maintain a predetermined relatively low pressure in the brew cylinder 10 during the entire brew time portion of the cycle and such a regulator may preferably be adjustable so that the flow rate of brewed coffee through the filter screen 13 may be predetermined to predetermine the coffee flavor.

Although the pressure relief valve 25 and pressure regulator 26 are shown to be provided in a separate air line to the stopper 20, it is possible that such devices may be incorporated in the piston rod connecting the cylinder 18 to the stopper 20 and this invention is therefore not limited to the provision of a separate line 23 as shown.

Various modifications will occur to those skilled in the art.

I claim as my invention:

1. An air operated coffee brewer of the type having a brew cup and a stopper movable into sealing relation with an upper open end of a brew cup during a brew cycle so that air under pressure may be introduced into the brew cup to force brewed coffee through a screen to a coffee outlet at the lower end of the brew cylinder, an air cylinder connected by a control valve to a source of air under pressure for moving the stopper into sealing relation with the brew cup during the brew cycle, and means for supplying air under pressure to the interior of said brew cup while said stopper is in the sealing relation comprising, a bore through said stopper; an air line connecting the air under pressure in said air cylinder to said bore, a pressure relief valve in said air line, said pressure relief valve being adapted to open only above a sufficient air pressure in said air cylinder to move and maintain said stopper into sealing relation with the brew cylinder.

2. The invention of claim 1 in which a regulator is provided in said air line intermediate said pressure relief valve and said stopper and adapted to predetermine the maximum air pressure in said brew cylinder to be less than the air pressure in said air cylinder.

3. The invention of claim 2 in which said regulator is a restriction opening.

4. The invention of claim 2 in which said regulator is a pressure regulating valve.

5. The invention of claim 2 in which said regulator is adjustable.

References Cited
UNITED STATES PATENTS

| | | | |
|---|---|---|---|
| 3,349,690 | 10/1967 | Heier | 99—302 X |
| 3,369,478 | 2/1968 | Black | 99—302 X |
| 3,426,670 | 2/1969 | Wittern | 99—283 X |

ROBERT W. JENKINS, Primary Examiner